United States Patent [19]
Rabut

[11] 3,779,813
[45] Dec. 18, 1973

[54] MANIFOLD SYSTEM FOR ELECTRICAL ENERGY STORAGE SYSTEMS
[75] Inventor: Eugene W. Rabut, Utica, Mich.
[73] Assignee: Occidental Energy Development Company, Madison Heights, Mich.
[22] Filed: Aug. 21, 1972
[21] Appl. No.: 282,185

[52] U.S. Cl. .............................. 136/161, 136/162
[51] Int. Cl. ........................................ H01m 7/02
[58] Field of Search...136/159–162, 164, 165, 83 R, 136/155, 86 S, 86 C; 137/260, 266

[56] References Cited
UNITED STATES PATENTS
615,172  11/1898  Hess .............................. 136/159 X
1,258,266  3/1918  Sokal .............................. 136/154
2,921,110  1/1960  Crowley et al. ............... 136/160 X
3,713,888  1/1973  Symons ............................ 136/162

Primary Examiner—Anthony Skapars
Attorney—William J. Schramm et al.

[57] ABSTRACT

A manifold system for circulating an aqueous electrolyte through a plurality of chambers of a plurality of cells of a secondary electrical energy storage system and which manifold system facilitates an assembly and disassembly of the cells and further assures a substantially uniform distribution of electrolyte to each of the individual cells.

6 Claims, 4 Drawing Figures

PATENTED DEC 18 1973  3,779,813

MANIFOLD SYSTEM FOR ELECTRICAL ENERGY STORAGE SYSTEMS

BACKGROUND OF THE INVENTION

The present invention broadly pertains to electrical energy storage systems of the type which utilize a halogen hydrate as the source of elemental halogen which is reduced at a normally positive electrode and an oxidizable metal which is adapted to become oxidized at the normally negative electrode of the storage cell or battery during a normal electrical discharge of the system. An aqueous electrolyte solution is employed which is recirculated through the cells effecting a continuous replenishment of the supply of halogen consumed during the electrical energy generation reaction. The aqueous electrolyte contains the dissolved ions of the oxidized metal and the reduced halide and is continuously circulated between the cell area containing the electrodes and a storage area containing halogen hydrate which progressively decomposes, liberating additional elemental halogen for consumption at the positive electrode.

Secondary batteries of the foregoing type are characterized as being of the high energy density (H.E.D.) type since they are capable of supplying upwards of 50 watt hours of electric power per pound of weight. The compactness and electrical capacity of such electrical energy storage systems renders them particularly satisfactory for use as principal or auxiliary sources of electrical energy in both mobile and stationary power plant systems. The efficiency and simplicity in recharging or refueling such secondary storage batteries also comprises an important feature thereof, enhancing the flexibility and versatility of their use.

Electrical energy storage systems of the type to which the present invention is applicable is described in detail in copending United States patent application Ser. No. 50,054, filed June 26, 1970, entitled "Halogen Hydrates," which is owned by the same assignee as the present invention. The elemental halogen system in such a storage battery is conveniently stored in the form of a halogen hydrate which decomposes during normal discharge of the battery, liberating elemental halogen and water which is conveyed by the aqueous electrolyte to within the cell in which the electrochemical reaction takes place. Similarly, the elemental metal may alternatively be stored within the cell and refueled or replaced during a recharging cycle or, alternatively, can be replenished by entrainment in the recirculating electrolyte in the form of minute suspended particles.

In any event, it will be apparent from the foregoing that uniform and unrestricted circulation of the electrolyte between the halogen hydrate storage reservoir and the individual cells of the battery is an important feature to provide optimum efficiency in operation. It is also important that the structural features of the system through which the electrolyte is circulated enables quick and simple assembly and disassembly as may be desired or required from time to time for inspection or for refueling the electrical energy storage system.

The present invention, accordingly, provides a simple, reliable and economical electrolyte distribution system which can readily be connected to one or a plurality of cells, assuring a substantially uniform circulation of the electrolyte therethrough.

SUMMARY OF THE INVENTION

The benefits and advantages of the present invention are achieved by a secondary electrical energy storage system which includes a plurality of cells, each comprised of a member defining a chamber in which a normally positive electrode is disposed for reducing an elemental halogen, such as chlorine disposed in electrical contact therewith, and a normally negative electrode for oxidizing an oxidizable metal, such as zinc disposed in electrical contact therewith during a normal discharge of the cell. Each cell of the storage system is formed with an inlet section having a bore extending between opposed faces thereof and an inlet port intersecting the bore and disposed in communication with the cell chamber. Similarly, each cell is formed with an outlet section having a second bore and an outlet port intersecting said second bore and disposed in communication with the cell chamber. Inlet and outlet conduits are disposed through the bores of the inlet and outlet sections of each cell and are formed with ports therealong at intervals corresponding to the spacing of the inlet and outlet sections, respectively. The conduits are sealingly mounted on each of the cell members by means of flanges encircling the inlet and outlet conduits and overlying the opposed faces of the inlet and outlet sections and are provided with O-ring sealing members or the like which are adapted to be deformed in sealing relationship around the conduits and faces of the inlet and outlet sections forming fluid-tight seals therebetween.

Additional advantages and benefits of the present invention will become apparent upon a reading of the description of the preferred embodiments taken in conjunction with the accompanying drawing.

DESCRIPTION OF THE PREFERRED EMBODIMENTS

Figure 1:
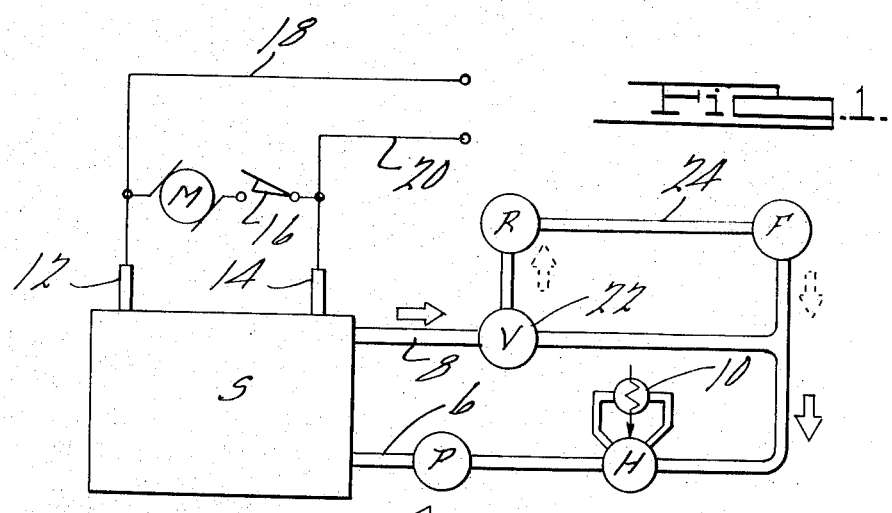
FIG. 1 is a schematic flow diagram illustrating the basic components of the secondary electrical energy storage system of the present invention and the circulation of electrolyte therebetween.

Referring now in detail to the drawing, and as best seen in FIG. 1, a secondary electrical energy storage system is schematically shown which is constructed in accordance with the preferred embodiments of the present invention. As illustrated, the rechargeable battery comprises an electrode area or stack, indicated at S, which is comprised of at least one and more usually a plurality of individual cells, each containing a normally positive electrode and a normally negative electrode. The electrode stack area S is connected by means of an inlet conduit 6 and an outlet conduit 8 to a halogen hydrate storage reservoir, indicated at H, and through which conduits an aqueous electrolyte is continuously recirculated, such as by means of a pump P.

During a normal electrical discharge cycle of the storage battery, the passage of the aqueous electrolyte solution through the hydrate storage reservoir H effects a progressive decomposition of the halogen hydrate therein, whereby the liberated halogen gas is dissolved and/or entrained in the electrolyte and is conveyed by means of the inlet or return conduit 6 to the cell area for replenishment of the elemental halogen consumed by reduction at the normally positive electrodes disposed therein. Since the decomposition of the halogen hydrate is an endothermic reaction, the halogen hydrate reservoir H is suitably provided with a heat exchanger, indicated at 10, for maintaining the halogen hydrate and the electrolyte in the reservoir at a temperature at which optimum performance of the electrical energy storage system is obtained.

The electrode stack area S is provided with a positive terminal 12 and a negative terminal 14, which are adapted to be electrically connected to a load, such as a drive motor indicated at M. Energization of the drive motor M is selectively accomplished in response to the manipulation of a switch 16 disposed in series in the circuit. Electrical conductors 18 and 20 are also provided which are electrically connected to the positive terminal 12 and negative terminal 14, respectively, and are employed during a recharging cycle of the battery in which they are connected to a source of direct current of opposite polarity.

During a recharging cycle, the reversal in the polarity of current flow is effective to cause a reversal in the chemical reaction, whereby the oxidized metal present in the form of a dissolved ion in the aqueous electrolyte becomes reduced at the normally negative electrode and plates out or otherwise deposits thereon while the dissolved halide ion becomes oxidized at the normally positive electrode and is transformed to the elemental state. The resultant elemental halogen either in dissolved form or in the form of minute bubbles entrained in the electrolyte is conveyed thereby through the outlet conduit 8 through a suitable selector valve 22 through a branch conduit 24 to a refrigeration device, indicated at R, in which heat is removed therefrom. Thereafter the cooled aqueous electrolyte is transferred to a hydrate forming device, indicated at F, in which a regeneration of the solid halogen hydrate is effected. The halogen hydrate thus regenerated is returned, preferably while entrained in the aqueous electrolyte, back to the halogen hydrate storage reservoir H in which it is separated and retained in readiness preparatory for the next electrical discharge cycle of the storage battery.

It is also contemplated in accordance with secondary electrical energy storage systems of the type herein described that a regeneration or recharging thereof can be accomplished remotely of the system by withdrawing a proportion of the aqueous electrolyte for reprocessing at a commercial service station and replacing the withdrawn electrolyte with a quantity of regenerated halogen hydrate and oxidizable metal in the metallic state.

Figure 2:
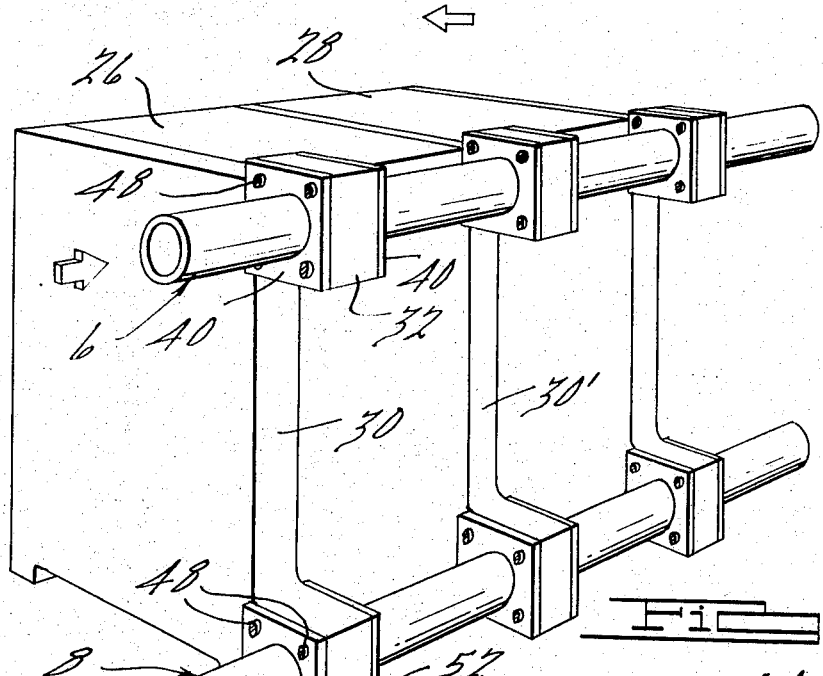
FIG. 2 is a fragmentary perspective view of a plurality of cells connected to an inlet and an outlet conduit through which the aqueous electrolyte is circulated.
Figures 3, 4:
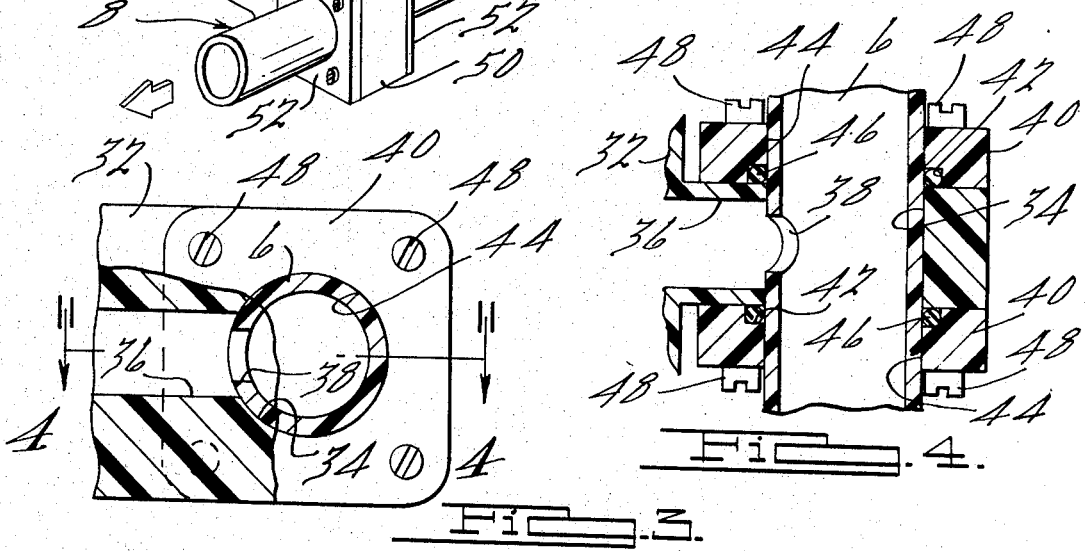
FIG. 3 is a fragmentary side elevational view, partly in section, showing a flanged assembly of the inlet conduit to the inlet section of a cell.
FIG. 4 is a horizontal transverse sectional view taken along the line 4—4 of FIG. 3.

In any event, it will be appreciated that proper performance of the rechargeable battery requires satisfactory electrolyte flow during the discharge cycle, as well as during an in situ recharging of the system. The manner of effecting a fluid-tight connection of the electrode stack area S with the inlet and outlet conduits 6, 8 will now be described in accordance with the structural arrangements as shown in FIGS. 2–4 of the drawing. As shown, two electrode containing cells 26, 28 are illustrated which are connected through an appropriate manifold system to the inlet conduit 6 and outlet conduit 8. It will be understood that any number of cells can be employed in accordance with the practice of the present invention to provide the desired electrical energy storage capacity consistent with the intended end use of the storage system.

Regardless of the number of individual cells employed, each cell is provided with a normally negative electrode and a normally positive electrode disposed within a chamber formed within the interior of the member comprising the cell. A manifold, such as the manifold 30, 30', is provided for each cell and is operative for circulating aqueous electrolyte through the interior chamber thereof and thereafter to return the recirculated electrolyte to the halogen hydrate reservoir for replenishment of the elemental halogen consumed in the electrochemical reaction. The manifold 30, as well as each of the remaining manifolds which are essentially identical in all respects to the manifold 30, is formed with an inlet section 32, as best seen in FIGS. 3 and 4, formed with a circular bore 34 therethrough in which the inlet conduit 6 is slidably disposed. The inlet section 32 is further formed with an inlet port 36 which intersects the bore 34 at one end and is disposed in communication with the interior chamber of the cell at the other end thereof. The inlet conduit 6, in turn, is formed with a plurality of ports or apertures 38 disposed at longitudinally spaced intervals therealong corresponding to the distance between the inlet section of adjacent manifolds. The aperture 38, as shown in FIGS. 3 and 4, is disposed in direct communication with the inlet port 36 for discharging aqueous electrolyte from the inlet conduit to the cell chamber.

The inlet conduit 6 is sealingly mounted within the bore of the inlet section 32 by means of a pair of opposed flanges 40 which are adapted to overlie the opposed side faces of the inlet section 32. Each of the flanges 40 is provided with a circular groove 42 in the inner face thereof adjacent to a central bore 44 therethrough, within which a deformable seal, such as an O-ring 46, is adapted to be seated and sealingly deformed when the flanges are in the installed position. Retention of the flanges in overlying clamping relationship against the side faces of the inlet section is suitably achieved by four machine screws 48 disposed with the threaded shank portions thereof in threaded engagement in the body of the inlet section. Upon installation, the flanges effect a deformation of the O-ring seal such that the periphery thereof is sealingly pressed against the periphery of the inlet conduit 6 and the exterior face of the inlet section forming a fluid-tight seal therebetween. The entire assembly can be simply disassembled by removing the retainer screws 48, enabling the inlet conduit to be withdrawn from the aligned series of bores 34 provided in each of the inlet sections of the stacked manifold.

The outlet conduit 8 is retained in the same identical manner as the inlet conduit by means of a series of outlet sections 50 formed on the lower side portion of each of the manifolds 30, 30', each formed with an aligned bore therethrough corresponding to the bore 34 of the inlet section and within which the outlet conduit is slidably disposed. Each outlet section is formed with an outlet port similar to the inlet port 36 of the inlet section, through which the aqueous electrolyte is transferred from the cell chamber through an aperture in the outlet conduit identical to the apertures 38 in the inlet conduit, whereby the withdrawn electrolyte is returned to the halogen hydrate reservoir. A plurality of pairs of flanges 52 are provided, each having a sealing groove identical to the groove 42 of the flanges 40, within which an O-ring seal is adapted to be disposed for sealingly engaging the opposed faces of the outlet sections and the periphery of the outlet conduit 8 forming a fluid-tight seal therebetween.

In the exemplary embodiments shown in the drawing, the inlet conduit 6 and the outlet conduit 8 are illustrated as being of substantially uniform cross sectional area throughout their lengths. In electrical energy storage systems of relatively high capacity utilizing electrode stack areas comprised of a large number of interconnected individual cells, a variation in the pressure of the electrolyte may occur along the lengths of the conduits due to the flow patterns and frictional resistance encountered. In such arrangements, in order to assure a substantially uniform distribution of electrolyte at each cell, it is usually preferred to incorporate controlled variations in the cross sectional area of the conduits along their lengths, thereby compensating for any pressure drops and nonuniform flow patterns which might otherwise be encountered.

It will be apparent from the foregoing arrangement that the inlet and outlet conduits, as well as the manifolds and cell members, may suitably be comprised of any natural or synthetic structural material which is resistant to attack from the constituents contained in the aqueous electrolyte and are also possessed of physical properties assuring adequate strength over the range of operating temperatures to which the rechargeable battery system is subjected during use. Generally, any one of a variety of plastic materials, as well as synthetic hard rubber materials, are suitable for this purpose and enable the fabrication of the components to within relatively accurate dimensional tolerances by mass production fabricating techniques, such as injection molding or the like. Included among the materials which are particularly suitable for this purpose are polyvinyl chloride, polyethylene, polypropylene, polytetrafluoroethylene, polyphenylene oxide, polyvinylidene fluoride and the like, as well as combinations thereof.

While it will be apparent that the invention herein disclosed is well calculated to achieve the benefits and advantages set forth above, it will be appreciated that the invention is susceptible to modification, variation and change without departing from the spirit thereof.

What is claimed is:

1. In an electrical energy storage system, the combination comprising a plurality of cells each comprising a member formed to define a chamber containing a positive electrode for reducing a halogen disposed in electrical contact therewith and a negative electrode for oxidizing an oxidizable metal disposed in electrical contact therewith during an electrical discharge of said cell, each said member formed with an inlet section including a first bore extending between opposed faces of said member and an inlet port intersecting said first bore and disposed in communication with said chamber and with an outlet section spaced from said inlet section and including a second bore extending between opposed faces of said member and an outlet port intersecting said second bore and disposed in communication with said chamber, an inlet conduit extending through said first bore of each said cell and an outlet conduit extending through said second bore of each said cell, said inlet and said outlet conduit formed with apertures at spaced intervals along the length thereof and disposed in communicative alignment with said inlet ports and said outlet ports, respectively; and flange means encircling the inlet and outlet conduits and overlying each of said opposed spaces of said inlet section and said outlet section, sealing means interposed between said flange means and said opposed faces, means for removably securing said flange means to said members, and means for circulating an aqueous electrolyte containing ions of said metal and said halogen through said inlet conduit through said cell and back through said outlet conduit.

2. The electrical energy storage system as defined in claim 1, wherein said first bores through said inlet section and said second bores through said outlet sections are disposed in axial longitudinal alignment with said inlet conduit and said outlet conduit, respectively.

3. The electrical energy storage system as defined in claim 1, wherein said first bore and said second bore are of a circular cross sectional configuration and said inlet conduit and said outlet conduit are disposed with the periphery thereof in close-fitting shape-conforming relationship relative to said first bore and said second bore, respectively.

4. The electrical energy storage system as defined in claim 1, in which said inlet conduit and said outlet conduit are of a substantially rigid construction and are slidably disposed within said first bore and said second bore, respectively.

5. The electrical energy storage system as defined in claim 1, wherein said sealing means comprise a deformable O-ring seal adapted to sealingly engage said flange means, said opposed face and the periphery of said conduit.

6. The electrical energy storage system as defined in claim 1, wherein said means for removably securing said flange means to said members comprise machine screws having the threaded shank portion thereof disposed in threaded engagement in said members.

* * * * *